US011974082B2

(12) United States Patent
Poole et al.

(10) Patent No.: US 11,974,082 B2
(45) Date of Patent: *Apr. 30, 2024

(54) AUDIO ASSEMBLIES FOR ELECTRONIC DEVICES

(71) Applicant: Amazon Technologies, Inc., Seattle, WA (US)

(72) Inventors: David Wilson Poole, Palo Alto, CA (US); Timothy Theodore List, Santa Cruz, CA (US); Jacobi Colton Grillo, San Francisco, CA (US); Wei Li, San Jose, CA (US); Tony David, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/751,928

(22) Filed: May 24, 2022

(65) Prior Publication Data

US 2022/0286763 A1  Sep. 8, 2022

Related U.S. Application Data

(63) Continuation of application No. 16/916,900, filed on Jun. 30, 2020, now Pat. No. 11,399,224, which is a
(Continued)

(51) Int. Cl.
*H04R 1/02* (2006.01)
*G06F 3/16* (2006.01)
(Continued)

(52) U.S. Cl.
CPC ............. *H04R 1/025* (2013.01); *G06F 3/167* (2013.01); *H04R 1/02* (2013.01); *H04R 1/04* (2013.01);
(Continued)

(58) Field of Classification Search
CPC ....... A01M 1/2083; A63J 17/00; A63H 33/22; G06F 3/0338; G06F 3/167;
(Continued)

(56) References Cited

U.S. PATENT DOCUMENTS 4,063,387 A    12/1977  Mitchell
4,176,581 A *  12/1979  Stuyvenberg ........... A63J 17/00
                                                  362/232
(Continued)

FOREIGN PATENT DOCUMENTS

WO        WO9210917        6/1992

OTHER PUBLICATIONS

Office Action for U.S. Appl. No. 16/916,900, dated Oct. 22, 2021, Poole, "Audio Assemblies for Electronic Devices", 20 pages.
(Continued)

*Primary Examiner* — Gerald Gauthier
(74) *Attorney, Agent, or Firm* — Lee & Hayes P.C.

(57) ABSTRACT

Voice-controlled devices that include one or more speakers for outputting audio. In some instances, the device includes at least one speaker within a cylindrical housing, with the speaker aimed or pointed away from a microphone coupled to the housing. For instance, if the microphone resides at or near the top of the cylindrical housing, then the speaker may point downwards along the longitudinal axis of the housing and away from the microphone. By pointing the speaker away from the microphone, the microphone will receive less sound from the speaker than if the speaker were pointed toward the microphone). Because the voice-controlled device may perform speech recognition on audio signals generated by the microphone, less sound from the speaker represented in the audio signal may result in more accurate speech recognition, and/or a lesser need to perform acoustic echo cancelation (AEC) on the generated audio signals.

20 Claims, 10 Drawing Sheets

Related U.S. Application Data continuation of application No. 16/193,258, filed on Nov. 16, 2018, now Pat. No. 10,708,677, which is a continuation of application No. 15/467,267, filed on Mar. 23, 2017, now Pat. No. 10,136,204, which is a continuation of application No. 14/502,301, filed on Sep. 30, 2014, now Pat. No. 9,641,919.

(51) Int. Cl.
  *H04R 1/04* (2006.01)
  *H04R 3/00* (2006.01)
  *G10L 15/20* (2006.01)

(52) U.S. Cl.
  CPC .............. *H04R 3/00* (2013.01); *G10L 15/20* (2013.01); *H04R 2400/00* (2013.01); *H04R 2410/00* (2013.01)

(58) Field of Classification Search
  CPC ... G06F 16/3329; G10H 1/0008; G10L 13/00; G10L 15/08; G10L 15/20; G10L 15/30; G10L 15/22; H04B 1/3888; H04B 10/116; H04H 60/04; H04L 63/10; H04R 1/02; H04R 1/025; H04R 1/04; H04R 1/1041; H04R 3/00; H04R 2400/00; H04R 2410/00; H04R 1/028; H04R 1/323; H04R 1/342; A61B 8/462; F21V 33/0056; H04M 1/22; H10K 50/81
  See application file for complete search history.

(56) References Cited

U.S. PATENT DOCUMENTS

| | | | |
|---|---|---|---|
| 4,297,677 A | 10/1981 | Lewis et al. | |
| 4,440,059 A * | 4/1984 | Hunter | A63J 17/00 340/815.46 |
| 4,574,906 A | 3/1986 | White et al. | |
| 4,817,163 A * | 3/1989 | Stastny | H04R 1/028 381/189 |
| 4,836,326 A | 6/1989 | Wehner | |
| 5,173,942 A | 12/1992 | Hirose | |
| 5,559,891 A | 9/1996 | Kuusama et al. | |
| 5,977,535 A | 11/1999 | Rostoker | |
| 6,215,992 B1 | 4/2001 | Howell et al. | |
| 6,438,241 B1 * | 8/2002 | Silfvast | H04H 60/04 84/625 |
| 6,652,132 B1 | 11/2003 | Hsueh | |
| 7,248,901 B2 | 7/2007 | Peiker | |
| 7,418,392 B1 * | 8/2008 | Mozer | G10L 13/00 315/307 |
| 8,855,295 B1 | 10/2014 | Chhetri et al. | |
| 8,885,815 B1 | 11/2014 | Velusamy et al. | |
| 8,898,064 B1 | 11/2014 | Thomas et al. | |
| 8,971,543 B1 | 3/2015 | List | |
| 8,983,383 B1 | 3/2015 | Haskin | |
| 9,060,224 B1 * | 6/2015 | List | G10L 15/08 |
| 9,332,098 B2 | 5/2016 | Horii | |
| 9,373,318 B1 | 6/2016 | Piersol et al. | |
| 9,574,762 B1 | 2/2017 | Grillo et al. | |
| 9,641,919 B1 | 5/2017 | Poole et al. | |
| 9,659,577 B1 | 5/2017 | Langhammer | |
| 9,716,778 B1 | 7/2017 | Walker | |
| 9,905,243 B2 | 2/2018 | Tsujikawa et al. | |
| 9,942,678 B1 | 4/2018 | Hartung et al. | |
| 10,136,204 B1 * | 11/2018 | Poole | H04R 1/04 |
| 10,708,677 B1 * | 7/2020 | Poole | G06F 3/167 |
| 10,748,529 B1 * | 8/2020 | Milden | G06F 3/167 |
| 11,399,224 B1 * | 7/2022 | Poole | H04R 1/02 |
| 2005/0153727 A1 | 7/2005 | Li | |
| 2006/0206582 A1 * | 9/2006 | Finn | H04L 63/10 709/217 |
| 2007/0042746 A1 | 2/2007 | Beard | |
| 2007/0047740 A1 * | 3/2007 | Andrea | H04R 1/1041 381/74 |
| 2007/0121319 A1 * | 5/2007 | Wolf | A01M 1/2083 362/231 |
| 2007/0128975 A1 * | 6/2007 | Dimitriou | A63H 33/22 446/397 |
| 2007/0213016 A1 | 9/2007 | Hoffman | |
| 2007/0298827 A1 | 12/2007 | Hansson | |
| 2008/0030587 A1 | 2/2008 | Helbing | |
| 2008/0138079 A1 | 6/2008 | Mui et al. | |
| 2008/0225510 A1 * | 9/2008 | Rocha | F21V 33/0056 362/86 |
| 2008/0248818 A1 | 10/2008 | Venkatesulu et al. | |
| 2008/0298045 A1 * | 12/2008 | Wright | F21V 33/0056 362/86 |
| 2009/0006099 A1 | 1/2009 | Sharpe et al. | |
| 2009/0143155 A1 | 6/2009 | Werner | |
| 2009/0160400 A1 | 6/2009 | Woud | |
| 2009/0161900 A1 * | 6/2009 | Enstad | H04R 1/342 381/357 |
| 2009/0238372 A1 * | 9/2009 | Hsu | H04R 1/323 381/61 |
| 2010/0202647 A1 | 8/2010 | Kuan | |
| 2012/0202551 A1 | 8/2012 | Mirbaha et al. | |
| 2013/0079637 A1 * | 3/2013 | Kann | A61B 8/462 600/443 |
| 2013/0177191 A1 | 7/2013 | Waguri et al. | |
| 2013/0190041 A1 | 7/2013 | Andrews et al. | |
| 2013/0240851 A1 * | 9/2013 | Seo | H10K 50/81 257/40 |
| 2013/0269503 A1 * | 10/2013 | Liu | G10H 1/0008 84/464 R |
| 2013/0301235 A1 * | 11/2013 | Harooni | H04M 1/22 362/11 |
| 2014/0172953 A1 | 6/2014 | Blanksteen | |
| 2014/0278419 A1 * | 9/2014 | Bishop | G06F 3/167 704/249 |
| 2014/0340372 A1 * | 11/2014 | Olsson | G06F 3/0338 345/184 |
| 2015/0043426 A1 * | 2/2015 | Aggarwal | H04B 10/116 370/328 |
| 2015/0098184 A1 | 4/2015 | Tsai et al. | |
| 2015/0110277 A1 * | 4/2015 | Pidgeon | H04R 3/00 381/56 |
| 2015/0147982 A1 * | 5/2015 | Aihsan | H04B 1/3888 455/90.2 |
| 2015/0248886 A1 * | 9/2015 | Sarikaya | G06F 16/3329 704/257 |
| 2016/0034132 A1 | 2/2016 | Huang et al. | |
| 2016/0042748 A1 * | 2/2016 | Jain | G10L 15/30 704/9 |
| 2017/0295275 A1 | 10/2017 | Houtchens et al. | |
| 2022/0286763 A1 * | 9/2022 | Poole | H04R 1/04 |

OTHER PUBLICATIONS

Office Action for U.S. Appl. No. 15/467,267, dated Dec. 14, 2017, Poole, "Audio Assemblies for Electronic Devices", 11 pages.
Office action for U.S. Appl. No. 14/502,301, dated Feb. 10, 2016, Poole et al., "Audio Assemblies for Electronic Devices", 11 pages.
Office Action for U.S. Appl. No. 16/916,900, dated Feb. 7, 2022, Poole, "Audio Assemblies for Electronic Devices", 10 pages.
Office Action for U.S. Appl. No. 15/467,267, dated Apr. 26, 2018, Poole, "Audio Assemblies for Electronic Devices", 8 pages.
Office Action for U.S. Appl. No. 16/193,258, dated Jun. 18, 2019, Poole, "Audio Assemblies for Electronic Devices", 18 pages.
Office action for U.S. Appl. No. 14/502,301, dated Jul. 28, 2016, Poole et al., "Audio Assemblies for Electronic Devices", 13 pages.

* cited by examiner

AUDIO ASSEMBLIES FOR ELECTRONIC DEVICES

RELATED APPLICATIONS

This application is a continuation of and claims priority to U.S. application Ser. No. 16/916,900, filed Jun. 30, 2020, which is a continuation of and claims priority to U.S. application Ser. No. 16/193,258 filed Nov. 16, 2018, which is a continuation of and claims priority to U.S. application Ser. No. 15/467,267, filed Mar. 23, 2017, now U.S. Pat. No. 10,136,204, which is a continuation of and claims priority to U.S. patent application Ser. No. 14/502,301, filed on Sep. 30, 2014, now U.S. Pat. No. 9,641,919. The entire disclosure of each of the above applications is incorporated herein by reference.

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
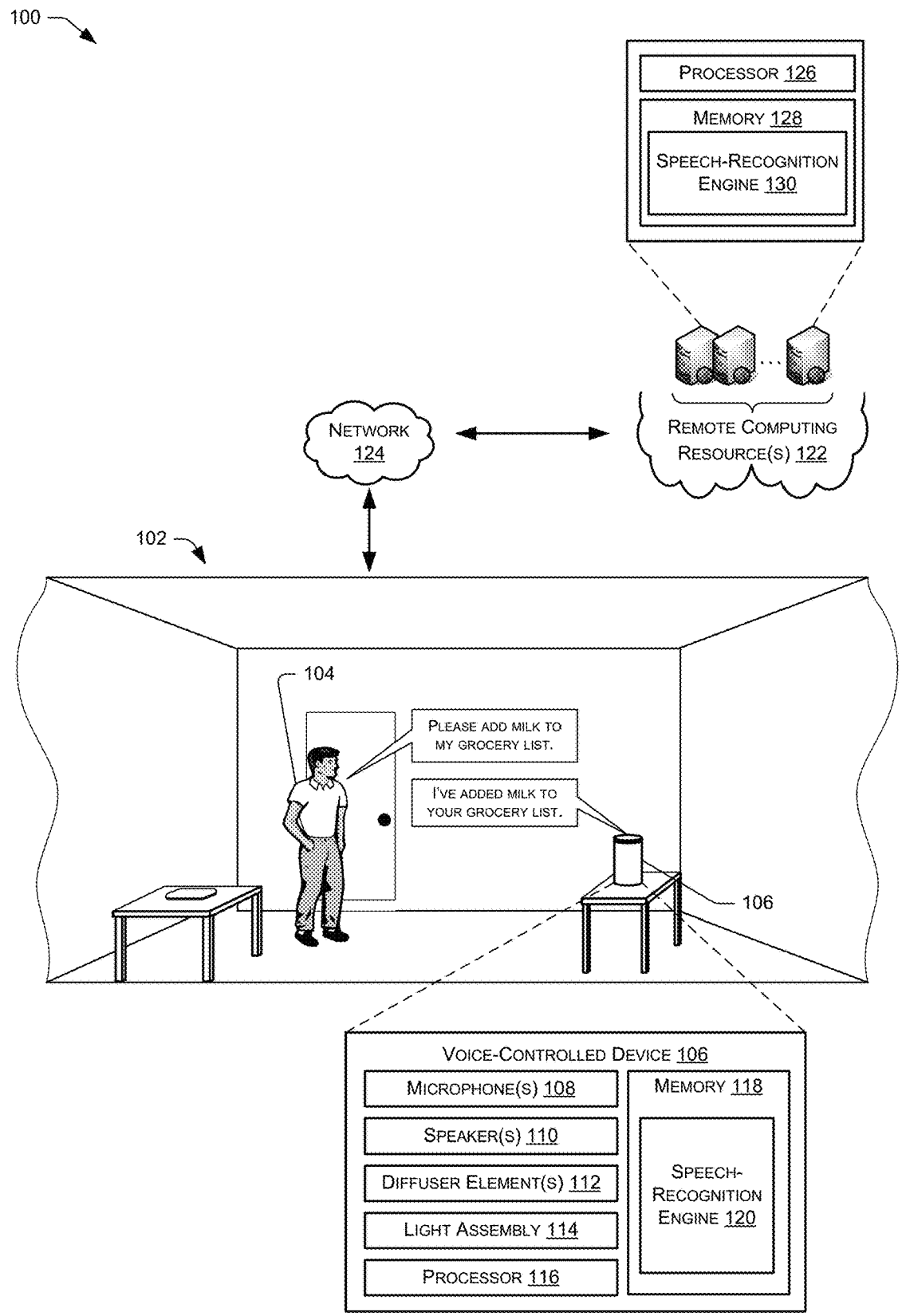
FIG. 1 shows an illustrative voice interaction computing architecture set in a home environment. The architecture includes a voice-controlled device physically situated in the home and communicatively coupled to remote computing resources. The voice-controlled device includes a microphone to receive voice commands, a light ring to provide visual cues to a user issuing the commands, and speakers for outputting audio to the user.

This disclosure describes, in part, electronic devices that include light assemblies for providing visual feedback to users that operate the electronic devices. In some instances, the devices comprise voice-controlled devices and, therefore, include one or more microphones for receiving audible commands from the users. After receiving a command, for instance, one such voice-controlled device may cause a corresponding light assembly of the device to illuminate in some predefined manner. This illumination may indicate to the user that device has received the command. In other instances, the devices may illuminate the lighting assembly for an array of other purposes. For instance, one such device may illuminate the corresponding light assembly when powering on or off, playing music, outputting information to a user (e.g., via a speaker or display), or the like.

In some instance, the voice-controlled device may comprise a housing that houses some or each component of the device. This housing may, in some instances, have a substantially uniform cross-sectional shape, such as a circle, square, triangle, or any other polygon. In some instances, the housing is cylindrical and includes one or more microphones near a first end of the cylindrical housing (e.g., a top of the housing when the device is standing up), as well as a light guide (e.g., a light ring) at or near a top of the housing. The light ring may comprise a single light pipe such that light received at a discrete portion of the light pipe diffuses to other locations near the discrete point. Further, while in some instances this element comprises a "ring", in other instances this light guide may take any other shape.

In addition, the device may include, near the top of the housing, a substrate having a bottom surface that includes multiple lighting elements, such as LEDs or the like. The device may include a controller that is able to power individual ones of the multiple lighting elements. For instance, the substrate may include any number of lighting elements (e.g., one, two, three, sixteen, one hundred, etc.), distributed substantially equally about a perimeter of the bottom surface of the substrate, while the controller may control one or more of the lighting elements individually at any time.

The device may further include a light reflector, underneath the substrate that includes the lighting elements. When the controller powers one or more of the lighting elements, the lighting elements may emit light downwards towards the light reflector and away from the light ring. The light reflector, which may also take the cross-sectional shape of the housing (e.g., circular in the case of the cylindrical housing) may include one or more cavities for receiving the emitted light of the lighting elements. In some instances, the light reflector includes one cavity for each lighting element coupled to the bottom surface of the substrate. Further, the lighting elements may sit within the cavities of the light reflector. When light from the lighting elements emits substantially downwards, the light may strike surfaces of the respective cavities, which may reflect the light substantially upwards and towards the light ring on the top of the cylindrical housing. Upon receiving the reflected light, the light ring illuminates at and near where the light hits the light ring. Because the light ring may reside on vertical walls of the cylindrical housing, the light ring may reside above each other component of the electronic device and may represent the highest point of the device. Therefore, the illuminated light ring may be visible to the user from each side of the device at any or most locations within a room.

In some instances, the light ring attaches to a component that rotates about a longitudinal axis of the cylindrical housing. For instance, the light ring may sit atop vertical walls of a light-reflector housing that includes a bottom surface and vertical walls. The light reflector as well as the substrate housing the lighting elements on the bottom surface of the substrate may reside at least partly within the light-reflector housing. However, the light-reflector housing—and the light ring attached thereto—may attach to a remainder of the cylindrical housing such that the light-reflector housing rotates freely about the longitudinal axis. The light reflector and the substrate housing the lighting elements, however, may remain stationary. In some instances, the rotation of the light-reflector housing may control functionality of the device. For instance, rotation of the light-reflector housing may control a volume or sound level of the device (clockwise for additional volume, counterclockwise for less volume), a brightness of a display, a brightness of the lights, whether the device is powered on or off, or the like.

Given that the light ring comprises a single element, such as a single light pipe, the light ring may illuminate at the proper location regardless of the freedom of the light-reflector housing to rotate about the longitudinal axis. For instance, envision that a first of sixteen lighting elements resides at a far left side of the cylindrical housing and is illuminated by a controller. Light from this lighting element may emit downwards into a respective cavity of the light reflector, which may in turn reflect the light upwards towards the light ring. The light ring may receive and partially diffuse the received light at and near where it is received, regardless of which section of the continuous, uniform light pipe receives the light.

In some instances, the voice-controlled device may further include one or more speakers for outputting audio. In some instances, the device includes at least one speaker within the cylindrical or other-shaped housing, with the speaker aimed or pointed away from the microphone. For instance, if the microphone resides at or near the top of the cylindrical housing, then the speaker may point downwards along the longitudinal axis of the housing and away from the microphone. By pointing the speaker away from the microphone, the microphone will receive less sound from the speaker than if the speaker were pointed otherwise (e.g., toward the microphone). Because the voice-controlled device may perform speech recognition on audio signals generated by the microphone, less sound from the speaker represented in the audio signal (e.g., from music playing by the speakers) may result in more accurate speech recognition, and/or a lesser need to perform acoustic echo cancelation (AEC) on the generated audio signals.

In some instances, the device may also include a diffuser element that diffuses sounds in a direction other than along the longitudinal axis. For instance, the diffuser element may comprise an element substantially uniform shape (e.g., a rounded top of a sphere, a cone, etc.) that diffuses sound traveling from the speaker, down the longitudinal axis, and out into a plane horizontal to the longitudinal axis. Further, the cylindrical housing may comprise a mesh of holes or other voids in order to allow the sound waves to easily escape the inside of the cylindrical housing. Further, because the diffuser element is substantially uniform, the sound may be diffused or dispersed substantially equally all the way around the device.

In some instances, the voice-controlled device includes multiple speakers, in-line with one another and pointed in a same direction. For instance, the device may include two speakers, both pointed downwards away from the microphone of the device. Further, the device may include, directly beneath each speaker, a respective diffuser element for diffusing sound from each respective speaker. Therefore, the sound from each speaker diffuses outwards substantially equally around the entire perimeter of the device.

The devices and techniques introduced above may be implemented in a variety of different architectures and contexts. One non-limiting and illustrative implementation is described below.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room of the home environment 102. In other implementations, it may be placed or mounted in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has a microphone unit comprising at least one microphone 108 and a speaker unit comprising at least one speaker 110 to facilitate audio interactions with the user 104 and/or other users. As introduced above, the device 106 may also include one or more diffuser elements for diffusing sound from the speaker about the device 106. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output.

The voice-controlled device may further include a light assembly 116 as introduced above. The light assembly 116 may comprise a light ring atop the device 106 for providing visual feedback to the user 104. One example implementation of the voice-controlled device 106 is provided below in more detail with reference to FIG. 10.

The microphone 108 of the voice-controlled device 106 detects audio from the environment 102, such as sounds uttered from the user 104. As illustrated, the voice-controlled device 106 includes a processor 116 and memory 118, which stores or otherwise has access to a speech-recognition engine 120. As used herein, a processor may include multiple processors and/or a processor having multiple cores. The speech-recognition engine 120 performs speech recognition on audio signals generated based on sound captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 122 that are remote from the environment 102. For instance, the voice-controlled device 106 may couple to the remote computing resources 122 over a network 124. As illustrated, the remote computing resources 122 may be implemented as one or more servers and may, in some instances, form a portion of a network-accessible computing platform implemented as a computing infrastructure of processors, storage, software, data access, and so forth that is maintained and accessible via a network such as the Internet. The remote computing resources do not require end-user knowledge of the physical location and configuration of the system that delivers the services. Common expressions associated with these remote computing resources include "on-demand computing", "software as a service (SaaS)", "platform computing", "network-accessible platform", "cloud services", "data centers", and so forth.

The servers may include a processor 126 and memory 128. As illustrated, the memory 128 may store and utilize a speech-processing engine 130 for receiving audio signals from the device 106, recognizing speech and, potentially, causing performance of an action in response. For instance, the engine 130 may identify speech within an audio signal by performing natural language understanding (NLU) techniques on the audio signal. In addition, the engine 130 may provide audio for output on a client device (e.g., the device 106) via text-to-speech (TTS). In some examples, the voice-controlled device 106 may upload audio data to the remote computing resources 122 for processing, given that the resources 122 may have a computational capacity that far exceeds the computational capacity of the voice-controlled device 106. Therefore, the voice-controlled device 106 may utilize the speech-processing engine 130 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 122 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth. In some instances, the device 106 also interacts with a client application stored on one or more client devices of the user 104.

The voice-controlled device 106 may communicatively couple to the network 124 via wired technologies (e.g., wires, USB, fiber optic cable, etc.), wireless technologies (e.g., WiFi, RF, cellular, satellite, Bluetooth, etc.), or other connection technologies. The network 124 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies.

Figure 2:
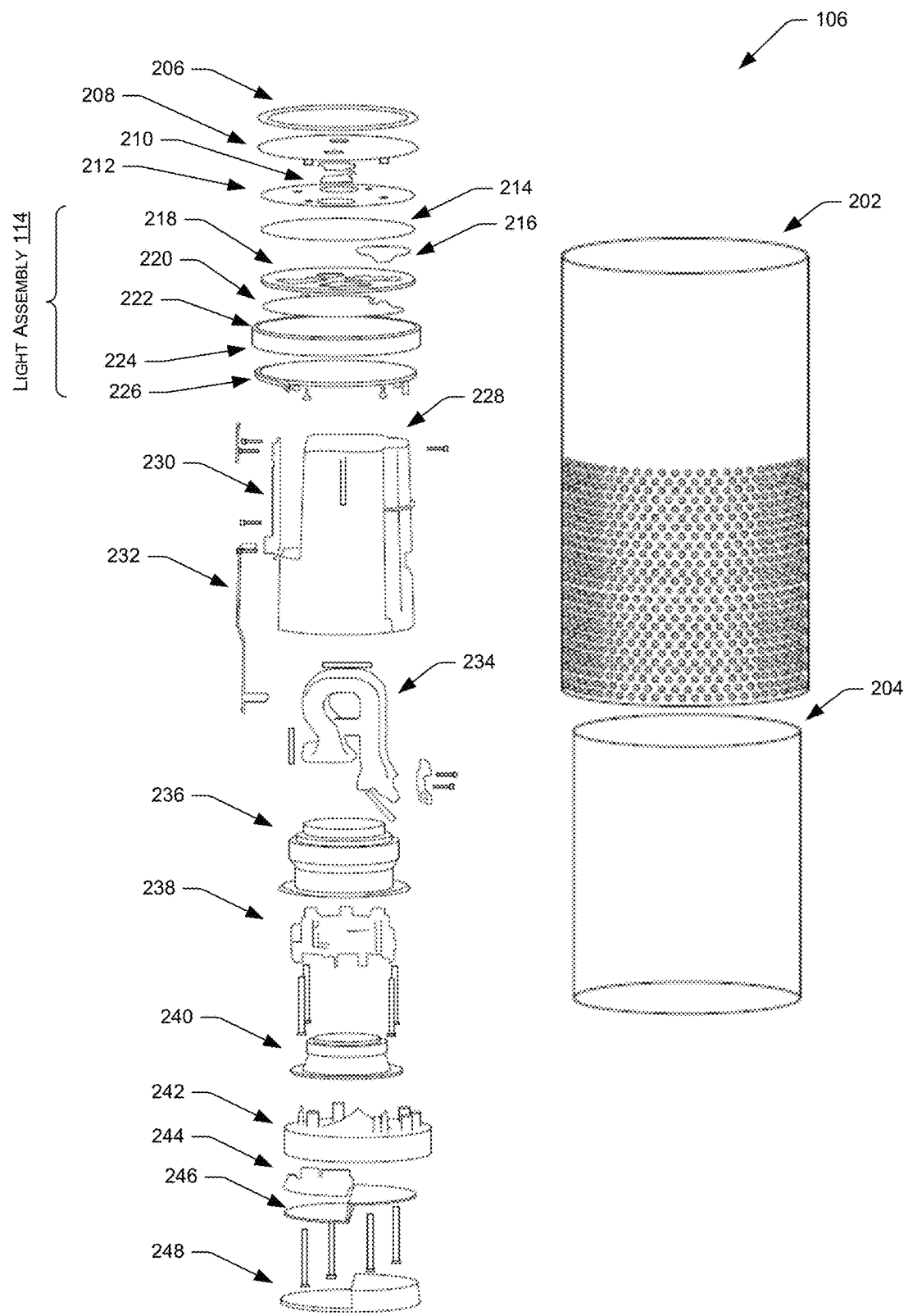
FIG. 2 illustrates an example embodiment of a layout of components of the voice-controlled device of FIG. 1.

FIG. 2 illustrates an example embodiment of components of the voice-controlled device of FIG. 1. First, the device 106 may comprise a housing 202 to which some or all of the remaining components of the device 106. In this example, the housing 202 comprises a cylindrical housing having a circular cross-section, although the housing 202 may take any other shape. Here, the housing 106 includes a solid portion near a top of the housing 202 and a mesh of holes around a perimeter nearer a bottom of the housing 202. These holes may allow for better airflow and, therefore, output of audio from the speaker(s) of the device 106. In some instances, the housing 202 comprises a plastic that has been extruded with laser-cut holes. In other instances, the housing 202 comprises metal or any other material and includes slots or other features for allowing sound to exit from inside the housing 202. In this illustrated example, the device 106 further includes a scrim 204 for protecting components within the housing 202.

As the reader will appreciate, some or all of the elements shown to the left of the housing may reside at least partly within the housing 202 when assembled. As illustrated, the top of housing 202 may include the light assembly 114, above which may reside portions of the sub-system of the device for capturing sound and generating audio signals (e.g., for identifying audible commands of a user). First, the device is shown to include a microphone grill 206, a top plate 208, one or more buttons 210, a microphone mesh 212, and an audio PCBA 214, which may house one or more microphones on its top surface. The top plate 208 includes holes to receive the buttons 210, which may be used to operate the device (e.g., power on and off, mute or unmute the microphones, etc.). The microphone mesh 212, meanwhile, may comprise a layer having a mesh of holes to allow sound to reach the microphone(s) on the top surface of the audio PCBA 214. Again, in some instances, each hole in these components may be laser cut for accuracy and precision.

An underside or bottom surface of the audio PCBA 214 may house one or more lighting elements, such as LEDs or the like. In some instances, these lighting elements may reside near a perimeter of the PCBA 214 and may be distributed substantially equally (i.e., may have equal spacing between one another). Beneath the audio PCBA 214 resides a gear encoder 216 and a light reflector 218. As introduced above, the light reflector 218 may reflect light emitted downwards back upwards toward a light ring discussed below. The light reflector 218 may be shaped as a ring and may include an equal number of cavities as lighting elements disposed on the bottom surface of the PCBA 214.

Underneath the light reflector 218, the device 106 may include a clamp plate 220, a light ring 222, and a light-reflector housing 224. The clamp plate 220 may secure the light reflector 218 in place when it is disposed inside the vertical walls of the light-reflector housing 224. The light reflector housing 224 may, as described above, attach to a top of the housing 202 in such as way as to rotate freely about the longitudinal axis of the housing 202 (e.g., to change a volume or other attribute of the device). As such, the light-reflector housing 224 may essentially comprise a rotating knob. The light ring 222, meanwhile, may reside atop vertical walls of the light-reflector housing 224. As such, the light ring 222 may be viewable from each side of the device and may also rotate freely about the longitudinal axis. Further, because the light ring 222 may comprise a single element (e.g., a single light pipe), light that is reflected off of the light reflector 218 may illuminate the light ring 222 at the proper location regardless of the state of rotation of the light-reflector housing 224. Finally, the device 106 may include an attaching plate 226 that secures the light-reflector housing 224 (and the components residing therein) onto the housing 202 in a rotatable manner.

Moving downwards within the device 106, the device 106 may further include an audio assembly for outputting audio within an environment in which the device 106 resides. This sub-system of the device 106 may first include a speaker housing 228 for housing one or more speakers, in addition to a main PCBA 230, and flexible cable 232. The main PCBA 230 may, in this example, house certain hardware components of the device (e.g., processors, physical memory, etc.), while the cable 232 may route power and electrical signals amongst the components of the device 106.

Next, the device includes a port 234, a first speaker 236, a first diffuser element 238, a second speaker 240, and a second diffuser element 242. The first and second speakers may be in line with one another and pointed downwards along the longitudinal axis of the housing 202 and away from the microphone disposed on the top surface of the audio PCBA 214. In some instances these speakers are the same size, while in other instances they differ and, therefore, output sound of different frequency ranges.

Figure 3:
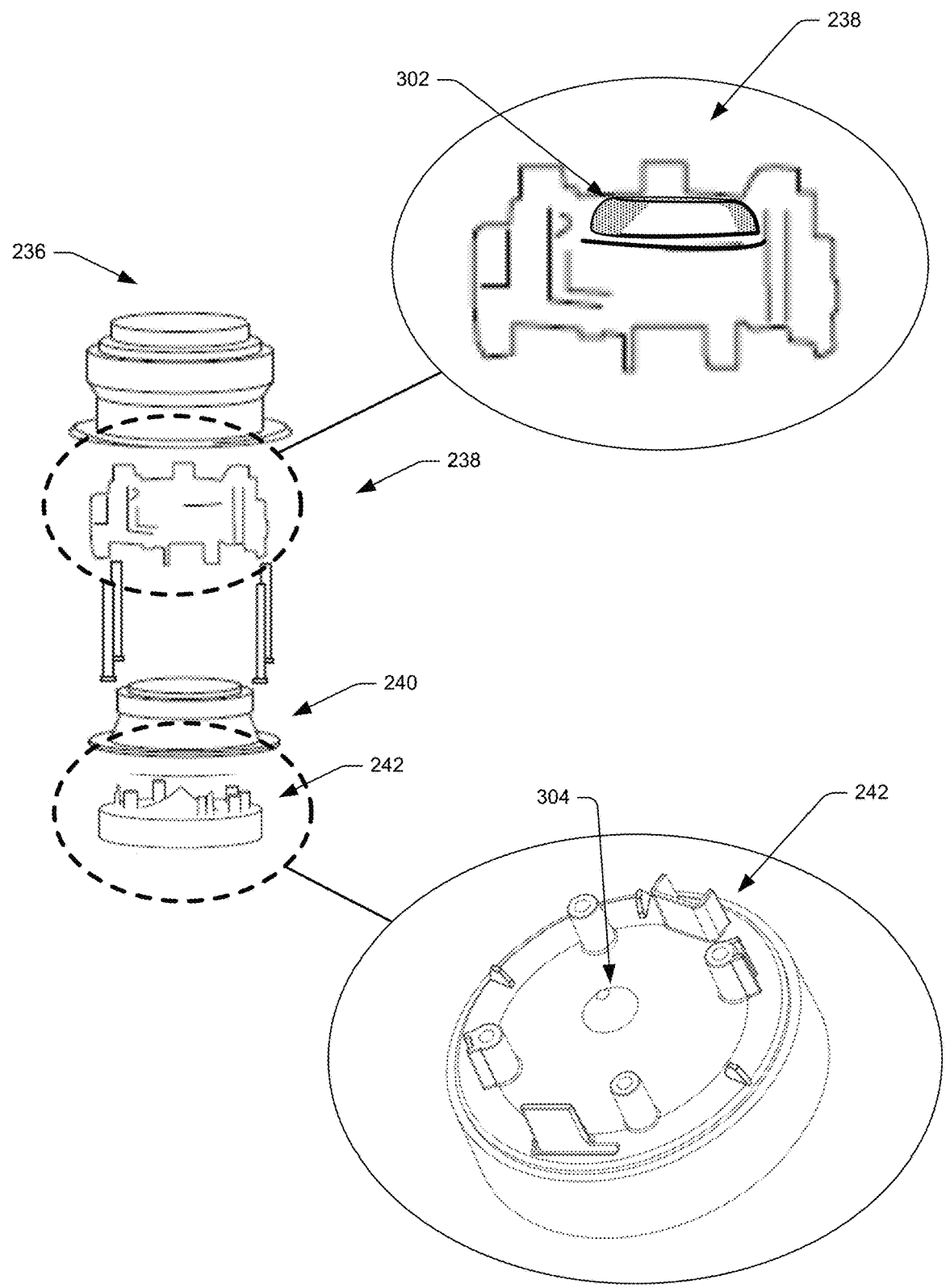
FIG. 3 illustrates two speakers and two diffuser elements that certain embodiments of the voice-controlled device may include.

The first diffuser element 242, meanwhile, may reside between the first speaker 236 and the second speaker 240 and may function to diffuse sound coming from the first speaker 236 outwards towards a horizontal plane relative to the device 106. In some instances, as illustrated in FIG. 3, the first diffuser element 242 includes a rounded surface for causing the sound waves from the first speaker 136 to move outwards, through the mesh of holes in the housing 202. The second diffuser element 242 may function similarly, albeit for the second speaker 240. The second diffuser element 242 may also include some sort of shape for causing the sound waves to travel outside of the housing towards the horizontal plane, such as a rounded top surface (e.g., partially spherical), a cone-shaped element, or the like. In some instances, the second diffuser element 242 may also comprise a housing base on which the housing 202 stands.

Finally, in this example, the device 106 includes a connector PCBA 244, a bottom plate 246, and a foot element 248. Further, a power source may reside within a cavity of the foot element 248 such that the bulk of the power source is within the housing 202 and the only portion of the power source outside of the housing 202 is a power cord running to an outlet. The foot element may reside within a cavity of the diffuser element 242 in some instances, and may comprise a rubber or other type of material having a high static coefficient of friction to provide stability to the device 106 when standing. The bottom plate 246 may couple the foot element 248 to the diffuser element 242, while the connector PCBA 244 may house electrical components for passing power up to other components of the device.

FIG. 3 illustrates, in further detail, the two speakers and two diffuser elements introduced in FIG. 2 above. As illustrated, both speakers point downwards in this example, although in other implementations the speakers can point in any direction (e.g., upwards, sideways, at an acute angle, etc.). Generally, the speakers point away from a location of the microphone of the device 106 so as to increase the signal-to-noise ratio (SNR) of any audio signals generated by the microphone.

In addition, FIG. 3 illustrates an implementation of the first diffuser element 238 at a greater level of detail. In this example, the first diffuser element 238 includes a top surface 302 that is rounded in a uniform manner all the way around the first diffuser element 238 (e.g., uniform in 360 degrees about the longitudinal axis). Further, this rounded top surface 302 may, in some instances, resemble a top portion of a flattened sphere. This top surface 302 functions to receive air carrying sound waves from the first speaker 236 and direct these sounds waves outwards horizontally in a substantially uniform manner about the longitudinal axis of the device 106.

The second diffuser element 242 is also shown in greater detail. AS illustrated, in this example the second diffuser element 242 includes a top surface 304 comprising a cone. This cone similarly functions to receive air carrying sound waves from the second speaker 240 and direct these sounds waves outwards horizontally in a substantially uniform manner about the longitudinal axis of the device 106. While FIG. 3 illustrates a flattened sphere and a cone sitting atop the diffuser elements, the reader will appreciate that other implementations may utilize other shapes for diffusing the sound horizontally.

Figure 4:
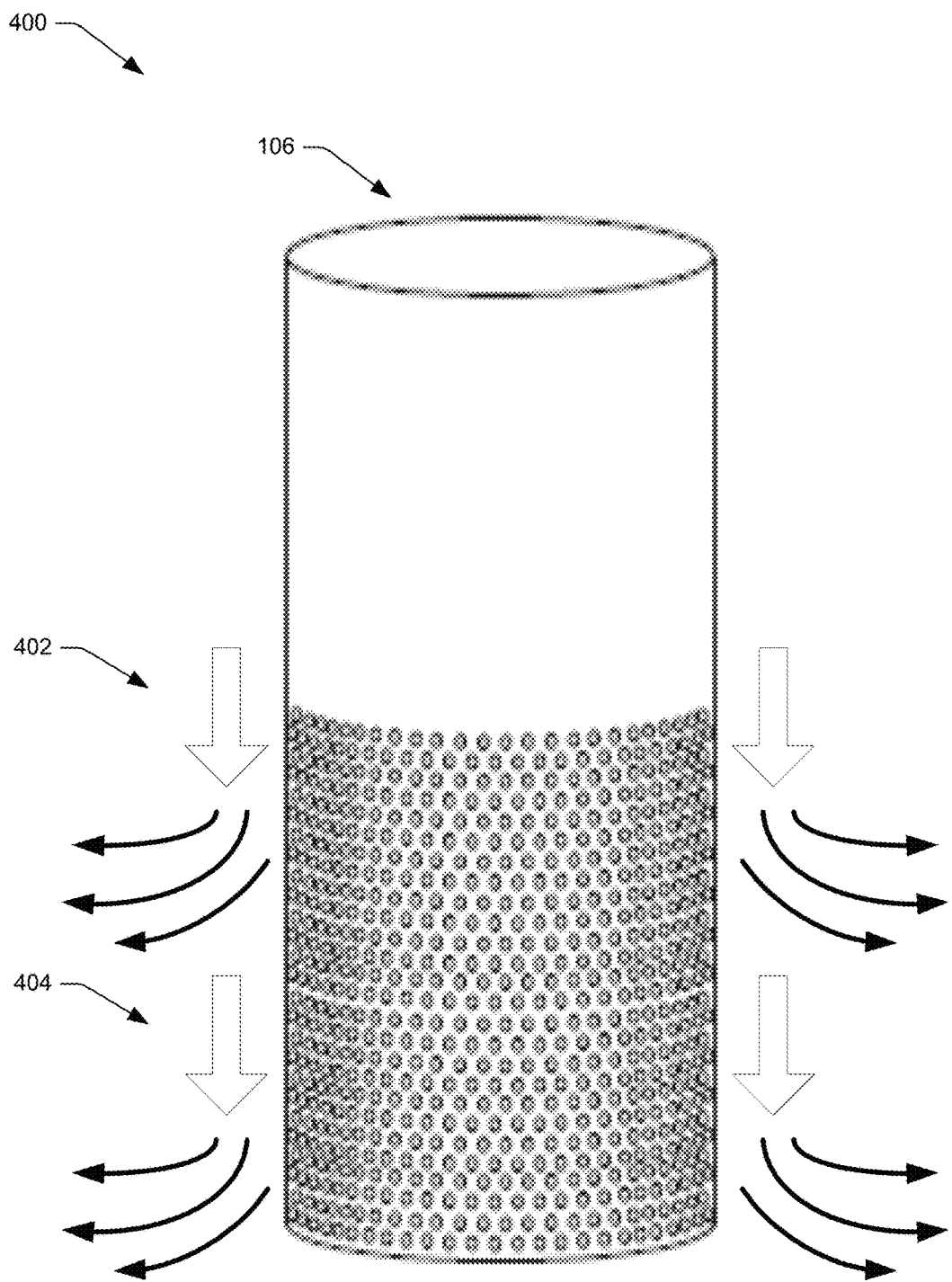
FIG. 4 illustrates an example scenario where sound emanating from the speakers shown in FIG. 3 travels substantially downwards before contacting the diffuser elements of FIG. 3 and traveling outwards, substantially uniformly in all horizontal directions.

FIG. 4 illustrates an example scenario where sound 402 emanating from the speakers shown in FIG. 3 travels substantially downwards before contacting the diffuser elements of FIG. 3 and traveling outwards, substantially uniformly in all horizontal directions. For instance, FIG. 4 illustrates that sound 402 emanating from the first speaker 236 contacts the first diffuser element 238, which directs this sound outwards substantially in a plane that is horizontal to the longitudinal axis of the device 106 in a substantially uniform manner. Further, sound 404 emanating from the second speaker 240 contacts the second diffuser element 242, which also directs this sound outwards in a substantially uniform manner.

Figure 5:
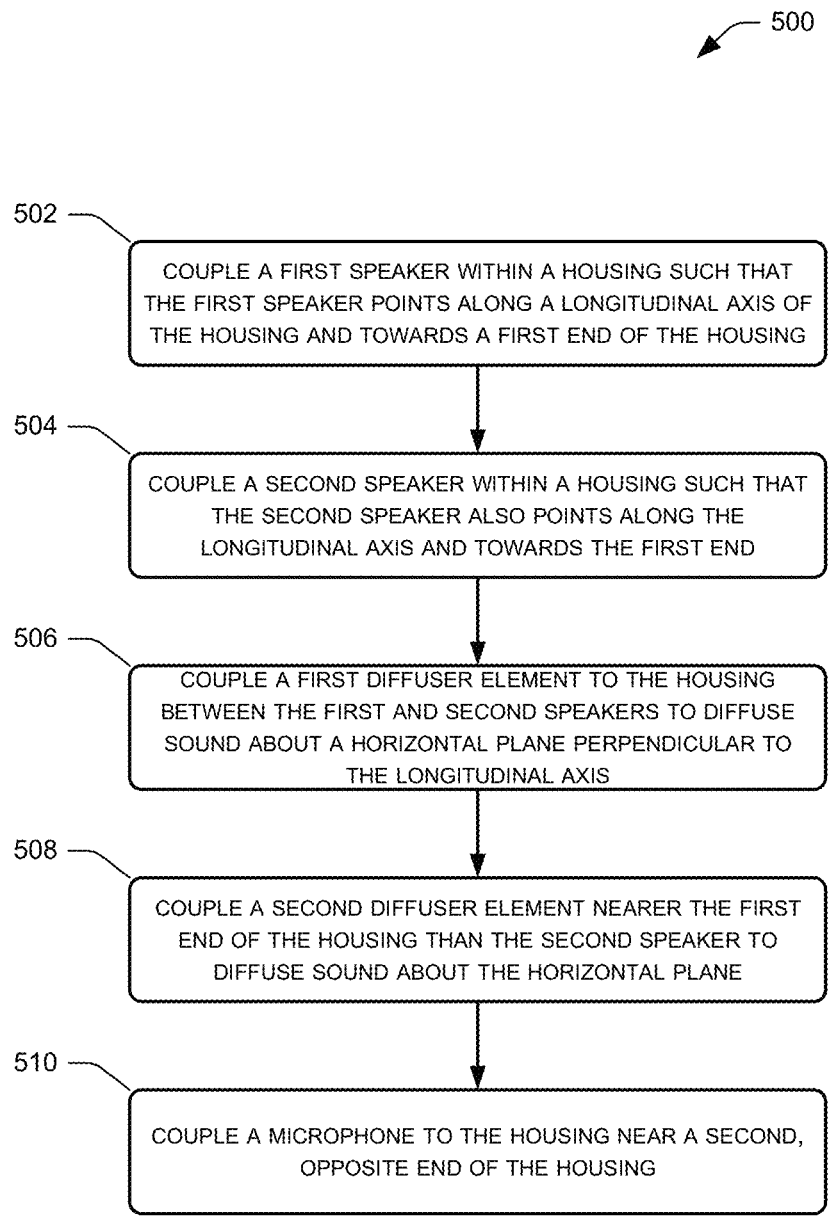
FIG. 5 illustrates an example process for assembling an electronic device that includes one or more speakers pointed away from an end of a housing at which a microphone resides. By positioning the speakers to point away from the microphone, audio signals generated by the microphone include less noise from the speakers, thereby reducing the amount of acoustic echo cancelation needed to isolate voice commands received at the device.

FIG. 5 illustrates an example process 500 for assembling an electronic device that includes one or more speakers pointed away from an end of a housing at which a microphone resides. By positioning the speakers away from the microphone, input signals generated by the microphone include less noise from the speakers, thereby reducing the amount of acoustic echo cancelation needed to isolate commands received at the microphone.

The process 500 includes, at 502, coupling a first speaker to and at least partly within a housing such that the first speaker points along a longitudinal axis of the housing and towards a first end of the housing. Next, at 504, the process 500 couples a second speaker to and at least partly within the housing such that the second speaker also points along the longitudinal axis of the housing and towards the first end of the housing.

At 506, the process 500 couples a first diffuser element to the housing at least partly between the first and second speakers, the first diffuser element configured to diffuse sound about a horizontal plane perpendicular to the longitudinal axis of the housing. At 508, the process 500 couples a second diffuser element to the housing, nearer the first end of the housing than both the first and second speakers, the second diffuser element configured to diffuse sound about the horizontal plane perpendicular to the longitudinal axis of the housing. Finally, at 510, the process 500 may couple a microphone to the housing near a second, opposite end of the housing.

Figure 6:
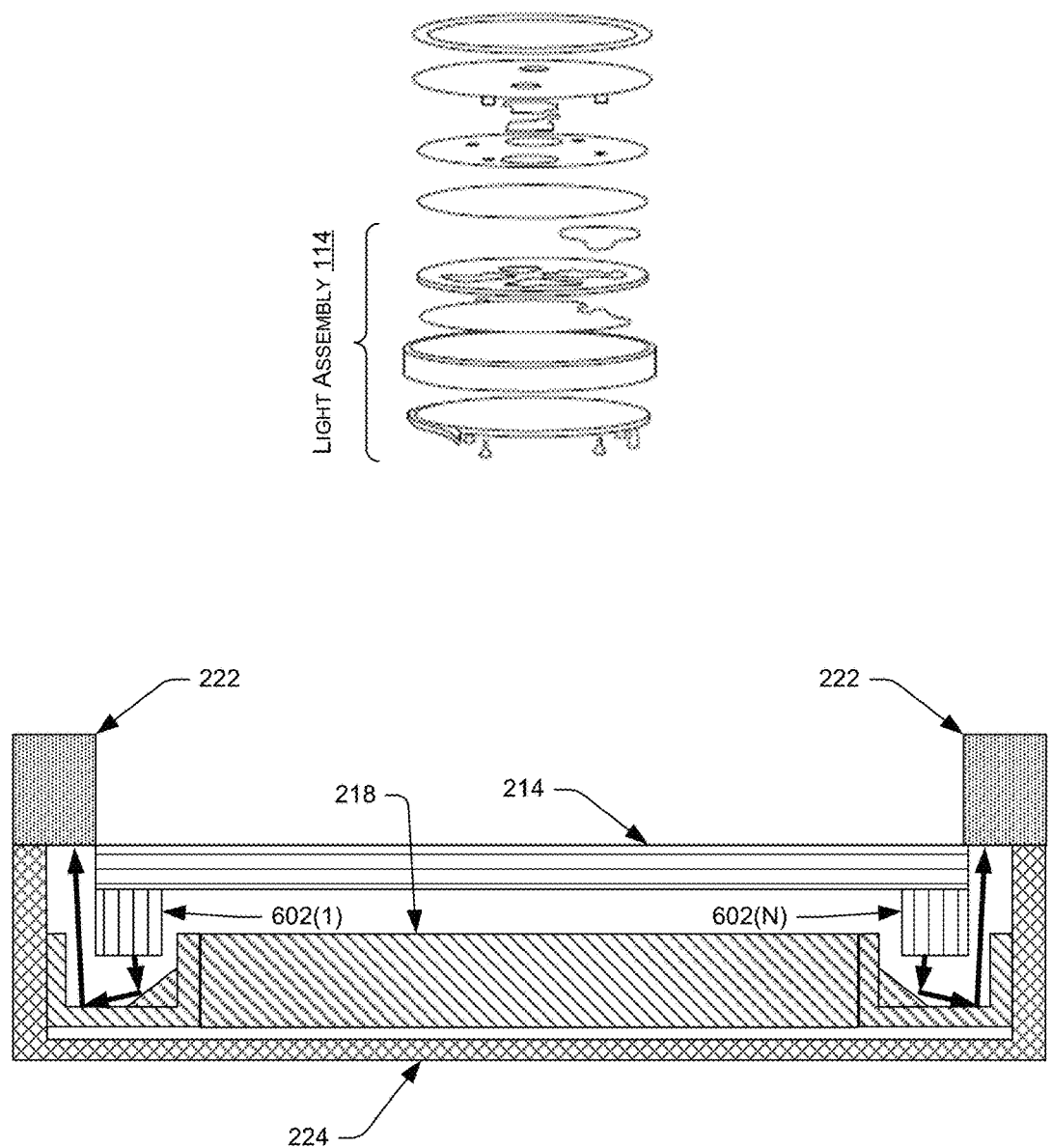
FIG. 6 illustrates an example embodiment of a light assembly, which the voice-controlled device of FIG. 1 may include for providing visual indications to a user of the device. In this example, multiple lighting elements (e.g., LEDs) couple to a bottom surface of a substrate. When one of the lighting elements is powered, the powered lighting element emits light substantially downwards and towards a light reflector, which includes multiple cavities (e.g., one cavity for each lighting element). The surface of the light reflector may reflect the light from the lighting element upwards towards the light ring, which may illuminate in response.

FIG. 6 illustrates an example embodiment of the light assembly 114, which the voice-controlled device 106 may include for providing visual indications to a user of the device. In this example, multiple lighting elements 602(1), ..., 602(N) couple to a bottom surface of a substrate, which in this example comprises the audio PCBA 214 (although the lighting elements may couple to any other substrate). Further, these lighting elements may, in some instances be disposed equally along an edge of a perimeter of the substrate. In some instances, a bottom surface of the audio PCBA 214 (or other substrated) is coated in a light-reflective material for the purpose of increasing light reflection.

When one of the lighting elements is powered by a controller of the device, the powered lighting element emits light substantially downwards and towards the light reflector 218, which includes multiple cavities (e.g., one cavity for each lighting element). The surface of the light reflector 218, potentially along with an inner surface of the vertical walls of the light-reflector housing 224, may reflect the light from the lighting element upwards towards the light ring 222, which may illuminate in response. In some instances, and as illustrated, the cavities of the light reflector 218 may include light-spreading elements for reflecting the light in certain directions. In this example, these elements have a triangular cross-section, although in other embodiments the elements may have a different shape (e.g., conical, sloping, etc.).

Figure 7:
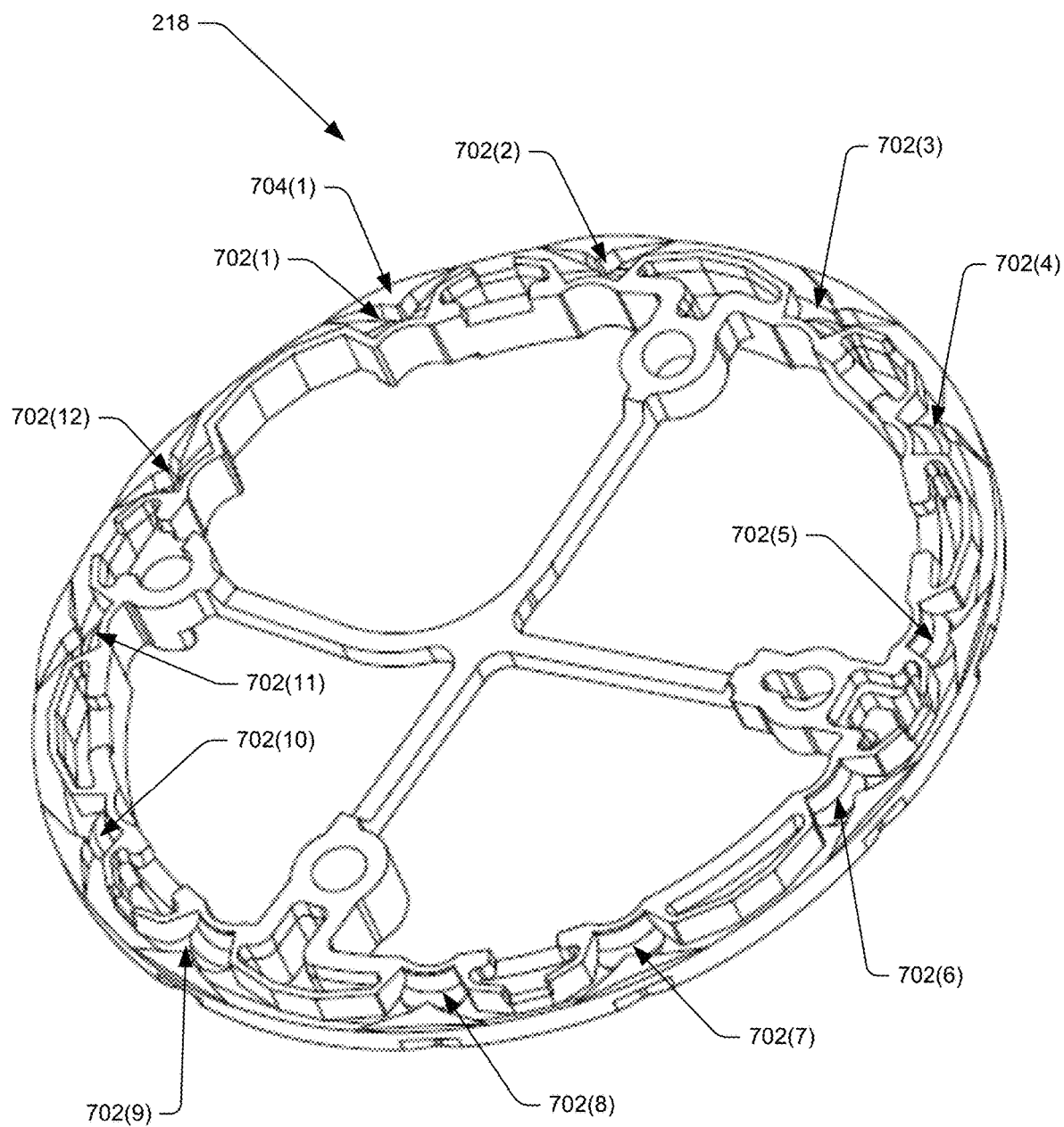
FIG. 7 illustrates an example embodiment of a light reflector including multiple cavities that receive respective lighting elements and that reflect upwards light received from the lighting elements.

FIG. 7 illustrates an example embodiment of the light reflector 218 that is circular in shape and that may receive the light from the lighting elements 602(1)-(N) and reflect it generally upwards towards the light ring 222. In this example, the light reflector 218 includes multiple cavities 702(1), ..., 702(12) that receive respective lighting elements 602(1)-(N) when the audio PCBA 214 (or other substrate holding the lighting elements) is coupled to the light reflector. Surfaces of these cavities 702(1)-(12) may receive the emitted light and reflect this light upwards. It is noted that while the light reflector 218 includes twelve cavities in this example (and, hence, the audio PCBA 214 may include twelve complementary lighting elements to reside at least partially within these cavities), the light reflector 218 may include any other number of cavities, which may be spaced substantially equally about the perimeter of the light reflector 218.

In addition, FIG. 7 illustrates that the light reflector 218 may include, adjacent to each cavity, a corresponding light-spreading element 704(1). While FIG. 7 illustrates a single light-spreading element 704(1) adjacent to the cavity 702(1), FIG. 7 illustrates that each cavity may be associated with a corresponding light-spreading element. The light-spreading element 704(1) may function to spread light that is received in the cavity prior to the light be reflected back upwards towards the light ring. That is, when the lighting elements emit light into the cavities, the cavities may reflect the light first toward the light-spreading elements, which may spread the light in different directions and back into the cavities, which in turn reflects the light upwards towards the light ring. By doing so, the light is further dispersed prior to reaching the light ring, which in turn diffuses the light even further for a more even illumination. While in this example the light-spreading element 704(1) comprises a triangular shape, in other implementations this element 704(1) may take any other shape.

Figure 8:
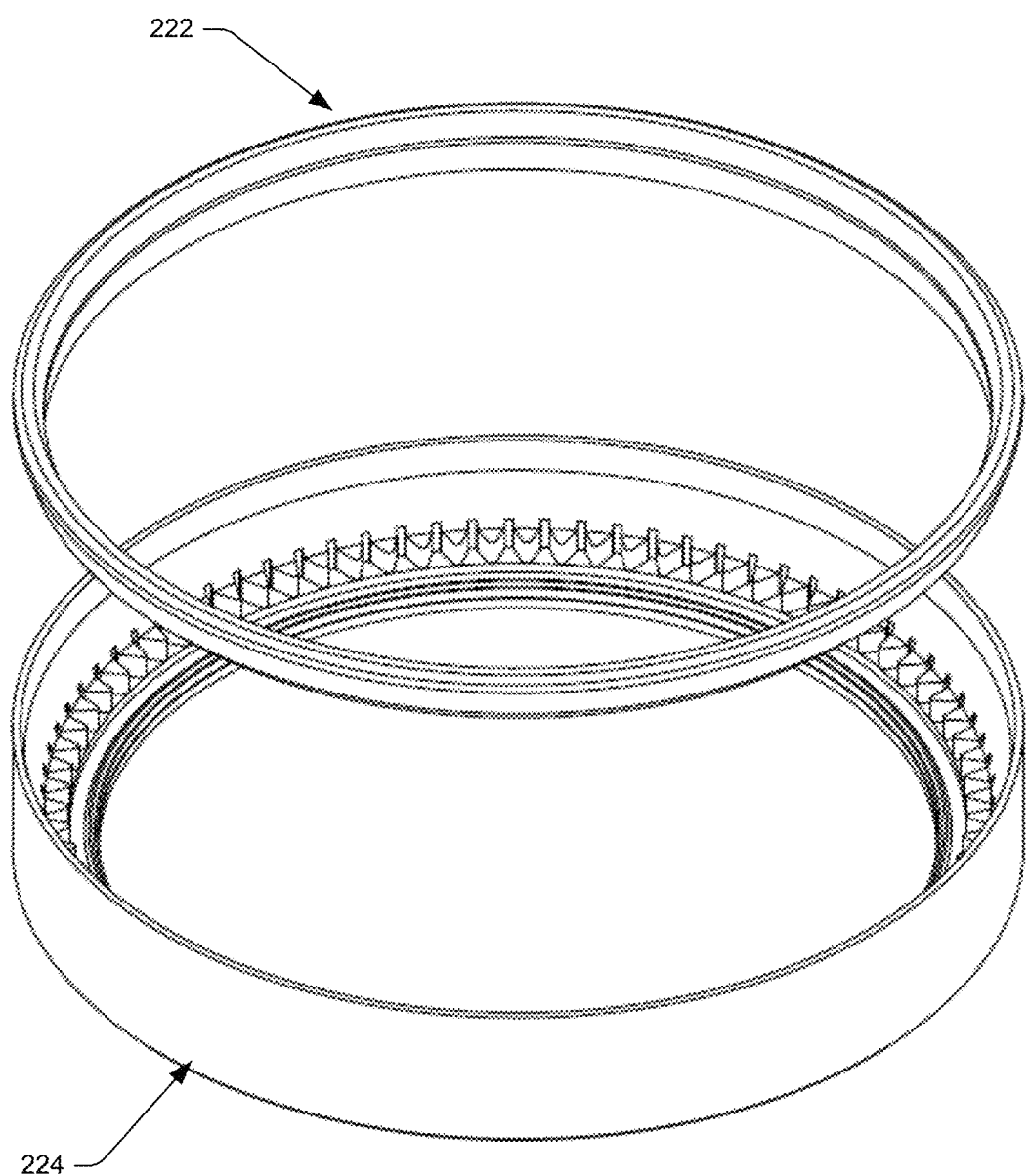
FIG. 8 illustrates an example embodiment of a light ring coupled to vertical walls of a reflector housing, which may hold the light reflector of FIG. 7.

FIG. 8 illustrates an example embodiment of the light ring 222 coupled to vertical walls of the light-reflector housing 224. The light ring 222 may comprise the singular light pipe and may be made of a diffusive material for diffusing light to locations near where the light pipe receives the light. Further, the light ring 22 may reside at the vertical walls of the light-reflector housing and, therefore, may comprise the highest point of the device 106.

Figure 9:
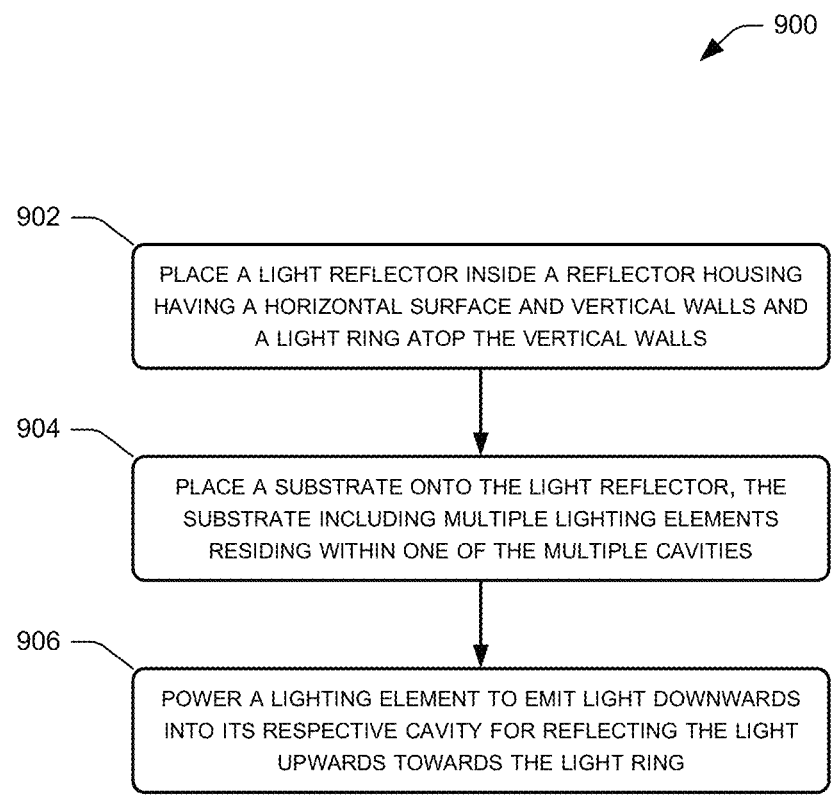
FIG. 9 illustrates an example process for assembling an electronic device that includes a light assembly for providing visual feedback to a user of the device.

FIG. 9 illustrates an example process 900 for assembling an electronic device that includes a light assembly for providing visual feedback to a user of the device. At 902, the process 900 places a light reflector, having multiple cavities on a top side of the light reflector, inside a reflector housing having a horizontal surface and vertical walls, wherein the reflector housing includes a light ring atop the vertical walls. At 904, the process 900 places a substrate onto the light reflector, the substrate including multiple lighting elements on a bottom surface of the substrate, each of multiple lighting elements residing at least partially within one of the multiple cavities of the light reflector when the substrate is placed onto the light reflector. Finally, at 906, the process 900 powers one of the multiple lighting elements, the powered lighting element emitting light substantially downwards into its respective cavity, a surface of the respective cavity reflecting the light substantially upwards towards the light ring, a portion of the light ring receiving the reflected light and illuminating.

Figure 10:
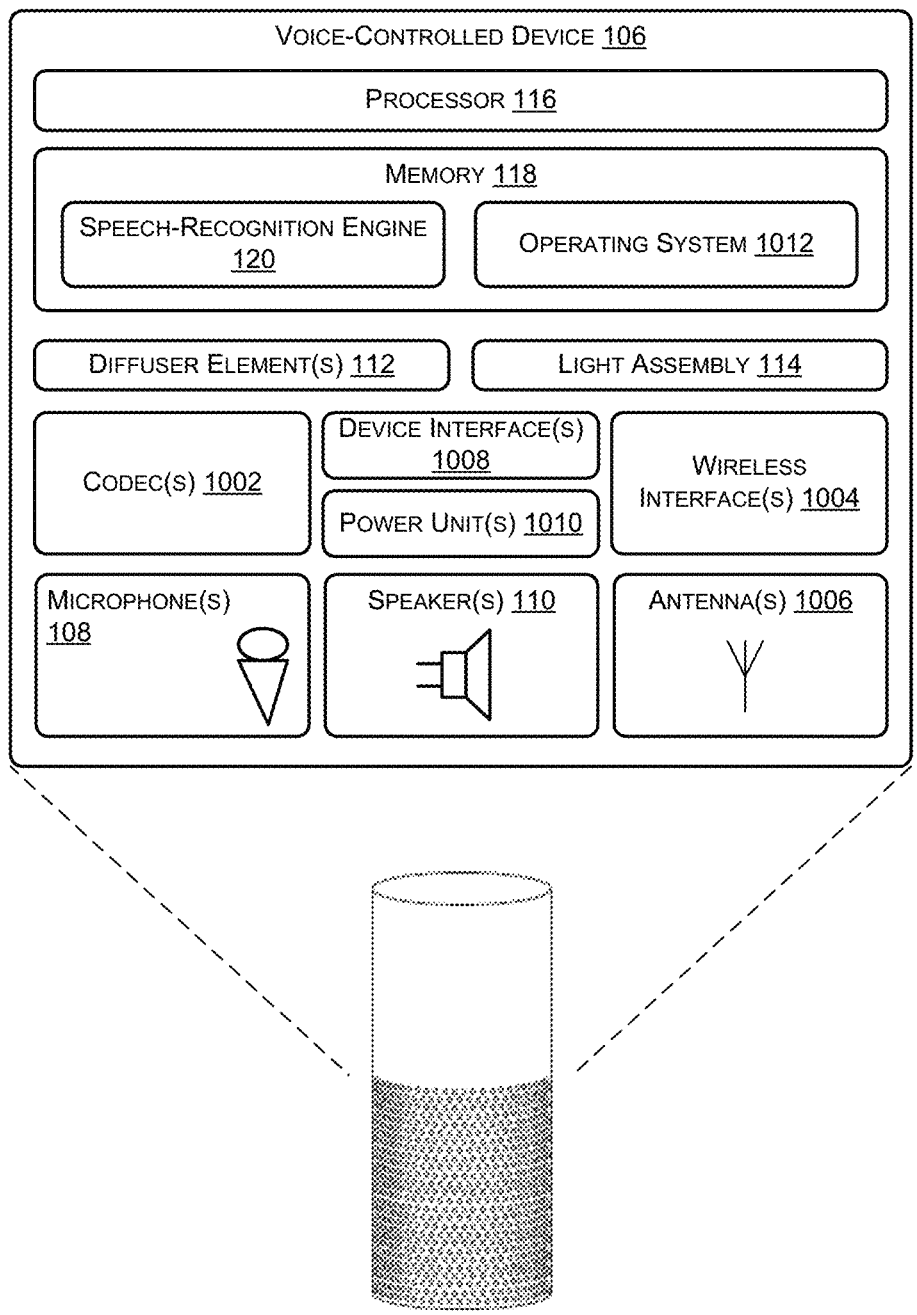
FIG. 10 shows a block diagram of selected functional components implemented in the voice-controlled device of FIG. 1.

FIG. 10 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 116 and memory 118. The memory 118 may include computer-readable storage media ("CRSM"), which may be any available physical media accessible by the processor 116 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 116.

The voice-controlled device 106 includes a microphone unit that comprises one or more microphones 108 to receive audio input, such as user voice input. The device 106 also includes a speaker unit that includes one or more speakers 110 to output audio sounds. The device 106 also includes the diffuser elements 112 and the light assembly 114, described above.

One or more codecs 1002 are coupled to the microphone(s) 108 and the speaker(s) 110 to encode and/or decode the audio signals. The codec may convert audio data between analog and digital formats. A user may interact with the device 106 by speaking to it, and the microphone(s) 108 captures sound and generates an audio signal that includes the user speech. The codec(s) 1002 encodes the user speech and transfers that audio data to other components. The device 106 can communicate back to the user by emitting audible statements through the speaker(s) 110. In this manner, the user interacts with the voice-controlled device simply through speech, without use of a keyboard or display common to other types of devices.

In the illustrated example, the voice-controlled device 106 includes one or more wireless interfaces 1004 coupled to one or more antennas 1006 to facilitate a wireless connection to a network. The wireless interface(s) 1004 may implement one or more of various wireless technologies, such as wife, Bluetooth, RF, and so on.

One or more device interfaces 1008 (e.g., USB, broadband connection, etc.) may further be provided as part of the device 106 to facilitate a wired connection to a network, or a plug-in network device that communicates with other wireless networks. One or more power units 1010 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple lighting elements (e.g., LEDs around perimeter of a top portion of the device) to indicate a state such as, for example, when power is on or to indicate when a command is received. But, otherwise, the device 106 does not use or need to use any input devices or displays in some instances.

Several modules such as instruction, datastores, and so forth may be stored within the memory 118 and configured to execute on the processor 116. An operating system module 1012 is configured to manage hardware and services (e.g., wireless unit, Codec, etc.) within and coupled to the device 106 for the benefit of other modules. In addition, the memory 118 may include the speech-recognition engine 120, discussed above.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
a housing;
one or more microphones coupled to the housing;
one or more speakers coupled to the housing;
a lighting element coupled to the housing;
one or more processors coupled to the housing; and
one or more non-transitory computer-readable media storing instructions that, when executed by the one or more processors, cause the device to perform operations comprising:
generating audio data, representing user speech, using the one or more microphones;
processing the audio data to determine a command associated with the user speech; and
outputting, using the lighting element, a visual indication based at least in part on the command.

2. The device of claim 1, the operations further comprising selecting the visual indication based at least in part on processing the audio data.

3. The device of claim 1, the operations further comprising:
sending, to one or more computing devices, information associated with the audio data; and
receiving, from the one or more computing devices, data representing the visual indication.

4. The device of claim 1, the operations further comprising outputting, using the one or more speakers, an audible output based at least in part on the audio data.

5. The device of claim 4, the operations further comprising selecting the audible output based at least in part on processing the audio data.

6. The device of claim 4, the operations further comprising:
sending, to one or more computing devices, information associated with the audio data; and
receiving, from the one or more computing devices, data representing the audible output.

7. The device of claim 1, wherein the lighting element comprises one or more light emitting diodes disposed proximate to a surface of the housing.

8. The device of claim 1, wherein the lighting element comprises a light ring disposed proximate to a surface of the housing.

9. The device of claim 1, wherein:
the housing includes a top surface and a bottom surface;
the one or more microphones are disposed at a first distance from the top surface;
the one or more speakers are disposed at a second distance from the top surface; and
the second distance is greater than the first distance.

10. The device of claim 1, wherein the housing includes a top surface opposite a bottom surface; and
wherein the lighting element comprises a light ring disposed proximate to the top surface of the housing.

11. A device comprising:
a housing that includes at least a surface;
a microphone disposed in the housing and configured to generate audio data representing user speech;
a speaker disposed in the housing and configured to emit sound that exits the housing;
a lighting element disposed proximate to the surface of the housing;
one or more processors disposed in the housing; and
one or more non-transitory computer-readable media storing instructions that, when executed by the one or more processors, cause the device to perform operations comprising:
processing the audio data to determine a command associated with the user speech; and
outputting, using the lighting element, a visual indication based at least in part on the command.

12. The device of claim 11, the operations further comprising selecting the visual indication based at least in part on processing the audio data.

13. The device of claim 11, the operations further comprising:
sending, to one or more computing devices, information associated with the audio data; and
receiving, from the one or more computing devices, data representing the visual indication.

14. The device of claim 11, the operations further comprising outputting, using the one or more speakers, an audible output based at least in part on the audio data.

15. The device of claim 14, the operations further comprising selecting the audible output based at least in part on processing the audio data.

16. The device of claim 14, the operations further comprising:
   sending, to one or more computing devices, information associated with the audio data; and
   receiving, from the one or more computing devices, data representing the audible output.

17. The device of claim 11, wherein the lighting element comprises one or more light emitting diodes disposed proximate to the surface of the housing.

18. The device of claim 11, wherein the lighting element comprises a light ring disposed proximate to the surface of the housing.

19. The device of claim 11, wherein:
   the housing further includes an additional surface;
   the one or more microphones are disposed at a first distance from the surface;
   the one or more speakers are disposed at a second distance from the surface; and
   the second distance is greater than the first distance.

20. The device of claim 11, wherein the surface comprises a top surface, and wherein:
   the housing includes a bottom surface opposite the top surface;
   the one or more microphones are disposed at a first distance from the top surface;
   the one or more speakers are disposed at a second distance from the top surface; and
   the second distance is greater than the first distance.

* * * * *